US 9,833,099 B1

(12) United States Patent
Ring et al.

(10) Patent No.: US 9,833,099 B1
(45) Date of Patent: Dec. 5, 2017

(54) TREE DECORATION HOLDER

(71) Applicants: Thomas D. Ring, Romeo, MI (US);
Maria P. Ring, Romeo, MI (US)

(72) Inventors: Thomas D. Ring, Romeo, MI (US);
Maria P. Ring, Romeo, MI (US)

(*) Notice: Subject to any disclaimer, the term of this patent is extended or adjusted under 35 U.S.C. 154(b) by 0 days.

(21) Appl. No.: 15/215,061

(22) Filed: Jul. 20, 2016

Related U.S. Application Data

(60) Provisional application No. 62/194,771, filed on Jul. 20, 2015.

(51) Int. Cl.
A47G 33/08 (2006.01)
F16M 13/02 (2006.01)
A47G 33/10 (2006.01)
F16B 1/00 (2006.01)
F16B 2/08 (2006.01)

(52) U.S. Cl.
CPC ............ A47G 33/10 (2013.01); A47G 33/08 (2013.01); F16B 1/00 (2013.01); F16B 2/08 (2013.01); F16M 13/022 (2013.01); A47G 2033/089 (2013.01); F16B 2001/0028 (2013.01)

(58) Field of Classification Search
CPC .. A47G 33/10; A47G 33/08; A47G 2033/089; F16B 1/00; F16B 2/08; F16B 2001/0028; F16M 13/022
USPC .................................... 428/18, 19; 47/42, 43
See application file for complete search history.

(56) References Cited

U.S. PATENT DOCUMENTS

| 1,227,105 | A | * | 5/1917 | Barnes | .................... E04G 25/06 211/208 |
| 1,598,016 | A | * | 8/1926 | Runser | .................... A47G 33/12 248/524 |
| 3,594,934 | A | * | 7/1971 | Burnbaum | ......... A47G 33/0809 40/414 |
| 4,746,022 | A | * | 5/1988 | Benham | .................... A47F 5/04 211/195 |
| 5,243,782 | A | * | 9/1993 | Jones | .................... A01G 27/00 47/40.5 |
| 5,615,516 | A | * | 4/1997 | Brown | ................ A01G 27/005 428/11 |
| 6,088,960 | A | * | 7/2000 | Hartzog | ............. A47G 33/0881 340/620 |
| 6,282,836 | B1 | * | 9/2001 | Goode | .................... A01G 17/10 47/43 |
| 6,283,157 | B1 | * | 9/2001 | Rocheleau | ............ F16L 23/024 138/109 |
| 6,599,591 | B1 | * | 7/2003 | Scott | .................... A41G 1/007 211/196 |
| 6,662,493 | B1 | * | 12/2003 | Bathey | .................... A01G 29/00 47/48.5 |
| 7,757,435 | B1 | * | 7/2010 | Boskofsky | ......... A47G 33/0881 47/40.5 |
| 2001/0001524 | A1 | * | 5/2001 | Rocheleau | ............ F16L 23/032 285/368 |

(Continued)

Primary Examiner — Muhammad Ijaz
(74) Attorney, Agent, or Firm — Ronald R. Kilponen

(57) ABSTRACT

A holder for affixing a user chosen decorative element to the top trunk of a tree is shown and described. Multiple methods are provided for affixing the holder to the decorative element. The holder is easily secured to the trunk and can be adjusted to obtain the most pleasing vertical and horizontal position of the decorative element. Electrical wiring can also be routed through the device to provide electrical power to the decorative element from a power supply.

15 Claims, 6 Drawing Sheets

(56) References Cited

U.S. PATENT DOCUMENTS

2002/0175255 A1* 11/2002 Hermanson ............ A47G 33/10
                                                    248/295.11
2014/0287168 A1*  9/2014 Harman ................. A47G 33/08
                                                    428/7

* cited by examiner

TREE DECORATION HOLDER

FIELD

The present version of these embodiments relate generally to the field of holders that can be used to attach decorative elements to the top of, for example, a Christmas tree or any other tree or bush.

BACKGROUND

These embodiments relate to devices that can be used to affix decorative elements to a Christmas tree or any other tree or bush. These embodiments relate to a holder that can be attached to various user chosen decorative elements by several methods and still be affixed securely and vertically even if the tree trunk is not exactly straight. Wiring can be routed through the device providing electrical power to the decorative element if desired.

Many persons celebrate the Christmas holiday and enjoy obtaining and decorating a Christmas tree. Others enjoy decorating trees for Christmas and many other holidays and events. One problem is attaching the decorative element to the top trunk of the tree. There exist several different methods to affixing these decorative elements to the top of the tree trunk. Several problems can occur in achieving this goal with traditional methods. Many times the trunk of the tree near the top is not straight. This can make installing a decorative element difficult. If the trunk is not relatively straight, then the decorative element will not extend beyond the top or near the top in a desirable position relative to those on the ground.

A second issue exists if the decorative element is somewhat heavy, this can cause the top trunk of the tree to bend and not allow a vertical location of the decorative element relative to the tree.

Another issue with decorative tree elements is that there does not appear to be much of a selection for decorative items or elements to mount to the top of the tree.

Many persons would enjoy installing such custom decorative items or elements such as sports team paraphernalia, paper-mache and anything else imaginable. Currently most users are limited to products that the market produces which are commonly called tree toppers. The problem becomes mounting these custom decorative items or elements to the tree such that they are secure, affixed in a relatively vertical position, customizable and easily installed.

Others may enjoy providing lighting, custom sounds or music to their decorative elements and thus need electrical power.

For the foregoing reasons, there is a need for a Tree Decoration Holder.

SUMMARY

In view of the foregoing disadvantages inherent in the background art there is a need for a device that allows the installation of decorative elements to the top trunk of a tree and especially a holiday or Christmas tree.

A first objective of these embodiments is to provide a device that can affix decorative elements to the top of a tree.

Another objective of these embodiments is to provide a device that can affix decorative elements to the top of a tree securely.

It is yet another objective of these embodiments to provide a device that allows adjustment to the vertical orientation of the decorative element when affixed to the tree.

It is a still further objective of these embodiments to provide a device that is relatively easy to install on the top trunk of a tree.

An additional objective of these embodiments is to provide a device that can allow the user to choose which personal decorative element that they would like to affix to the top trunk of the tree.

Another objective of these embodiments is to provide a device that can be attached multiple ways to the user's chosen decorative element.

A final objective of these embodiments is to allow the use of electrically powered custom decorative elements affixed to the top trunk of a tree.

These together with other objectives of these embodiments, along with various features of novelty which characterize these embodiments, are pointed out with particularity in the claims attached which form a part of this disclosure. For a better understanding of these embodiments, the operating advantages and the specific objectives attained by its uses, reference should be had to the accompanying drawings and descriptive matter in which there is illustrated a preferred embodiment.

DETAILED DESCRIPTION OF THE PREFERRED EMBODIMENTS

Figure 1:
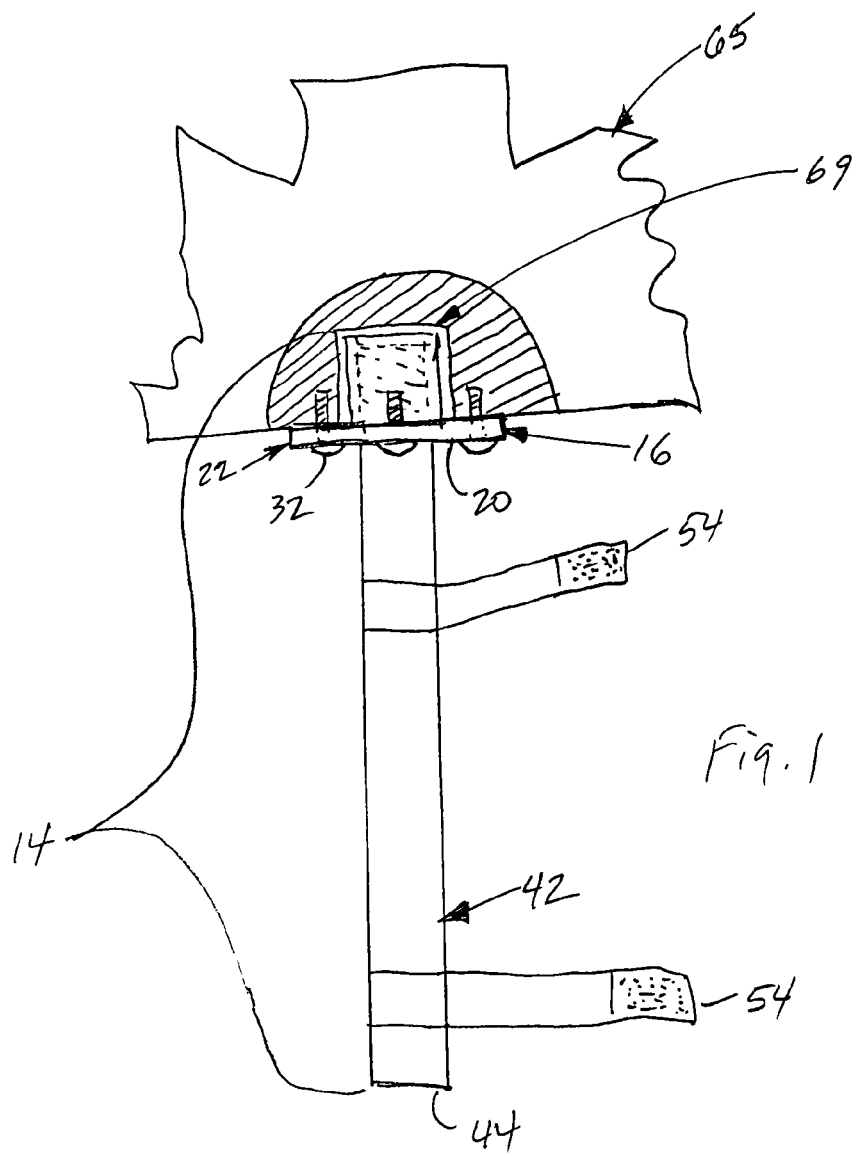
FIG. 1 shows a side view of one embodiment of the holder attached to a decorative element, the decorative element having a cutway portion.

Referring to the drawings in detail wherein like elements are indicated by like numerals, there is shown in FIG. 1 a side view of one embodiment of the holder 14 affixed to a decorative element 65 having a partial cutaway view. The holder 14 has a coupler 16 affixed to a rod 42.

Figure 3:
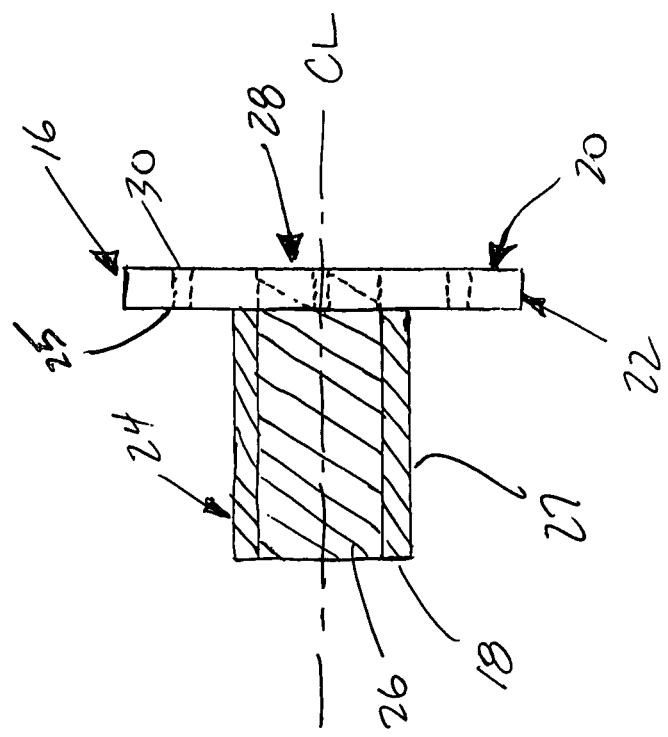
FIG. 3 shows a partial cross sectional view of one embodiment of the coupler.
Figure 2:
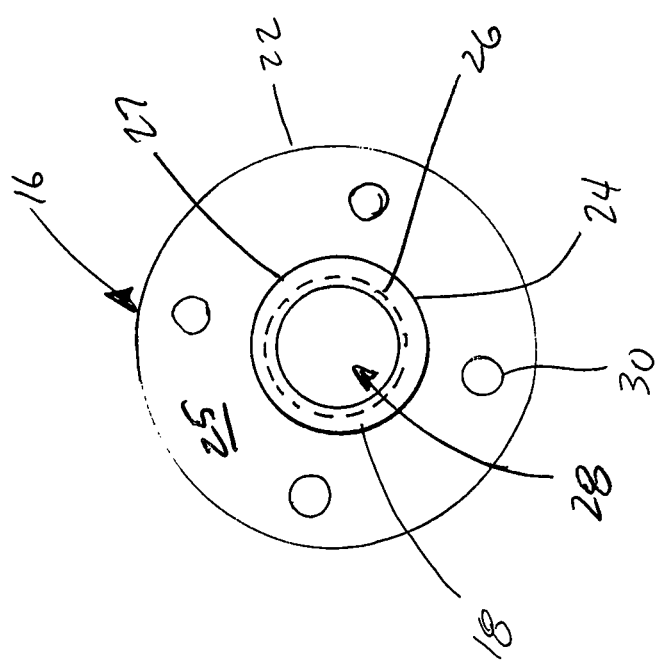
FIG. 2 shows a first side view of one embodiment of a coupler.

FIGS. 2, 3 show the coupler 16 having a first side 18 and a second side 20. Also seen is a ledge 25. A plate 22 is located on the second side 20 and the plate 22 is affixed to a cylinder 24. The plate 22 has a through hole 28 which is concentric with a hole 28 in the cylinder 24. The plate 22 also has a plurality of attachment holes 30. This embodiment shows four holes 30 located on a common circumference approximately ninety degrees from the center line of the hole 28. It should be appreciated that more or fewer holes 30 could be made dependent upon the anticipated loads in supporting the decorative element 65.

The outer surface 27 of the cylinder 24 could also have ribs parallel to the center line to increase the strength of the cylinder 24, not shown. There are threads 26 on the interior of the hole 28 for affixing the coupler 16 to the rod 42.

It should be understood that this embodiment shows but one method of attachment of the coupler 16 to the rod 42, FIG. 1. It should be apparent that the coupler 16 and rod 42 could be manufactured as one complete unit, for example, in a plastic injection mold.

Figure 4:
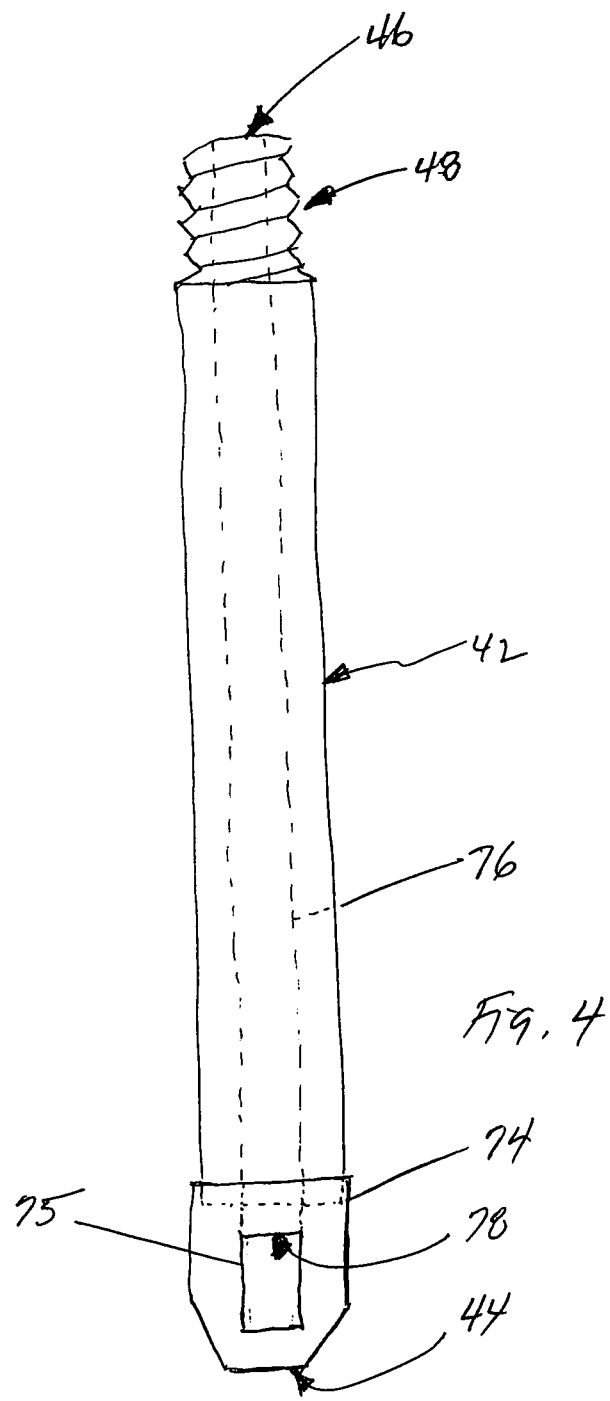
FIG. 4 shows a side view of one embodiment of a rod.

FIG. 4 shows one embodiment of the rod 42. What is shown is a cylindrical rod 42 having a first end 44 and a second end 46. Second end 46 is shown in this embodiment having threads 48. Threads 48 correspond with the threads 26 of the coupler 16. It should be appreciated that the rod 42 would not have to be a cylinder in cross section. Any cross section for the rod 42 could be used.

This embodiment of the rod 42 also has attached at the first end 44 a cap 74. Cap 74 has a slot 75 that runs there through. In this embodiment of the rod 42, the center of the rod 42 has a cavity 76 that runs the length forming essentially a hollow rod or pipe. The cavity 76 runs from the second end 46 to the first end 44. There is also an opening 78 in the cap 74 such that electrical wiring (not shown) can be run into the slot 75, through the cap 74 and into and through the rod 42 from the first end 44 to the second end 46. This would allow electrical power to be available to the decorative element 65 via the wiring running through the holder 14 and to a power supply (not shown). This feature would allow even more variety to the decorative element 65 in that various colors of lights, music and other sounds and any feature that requires electrical power could also be utilized to enhance decorative element 65.

FIG. 1 shows one embodiment of the holder 14 affixed to a decorative element 65. In this embodiment, the decorative element 65 has a cavity 69. To affix the coupler 16 to the decorative element 65 requires that the cylinder 24 be inserted into the cavity 69. The plate 22 ledge 25 is mounted flush against the surface of the decorative element 65. If needed holes can be drilled into the surface of the decorative element and fasteners 32 can be inserted from the second side 20 of the plate 22 through the attachment holes 30 and secured into the base of the decorative element 65, FIGS. 1, 2.

The rod 42 second end 46 threads 48 can then be screwed into the plate 22 and the cylinder 24 thereby securing the rod 42 to the coupler 16, FIGS. 1,2,3,5. This then affixes the holder 14 to the decorative element 65.

Figure 5:
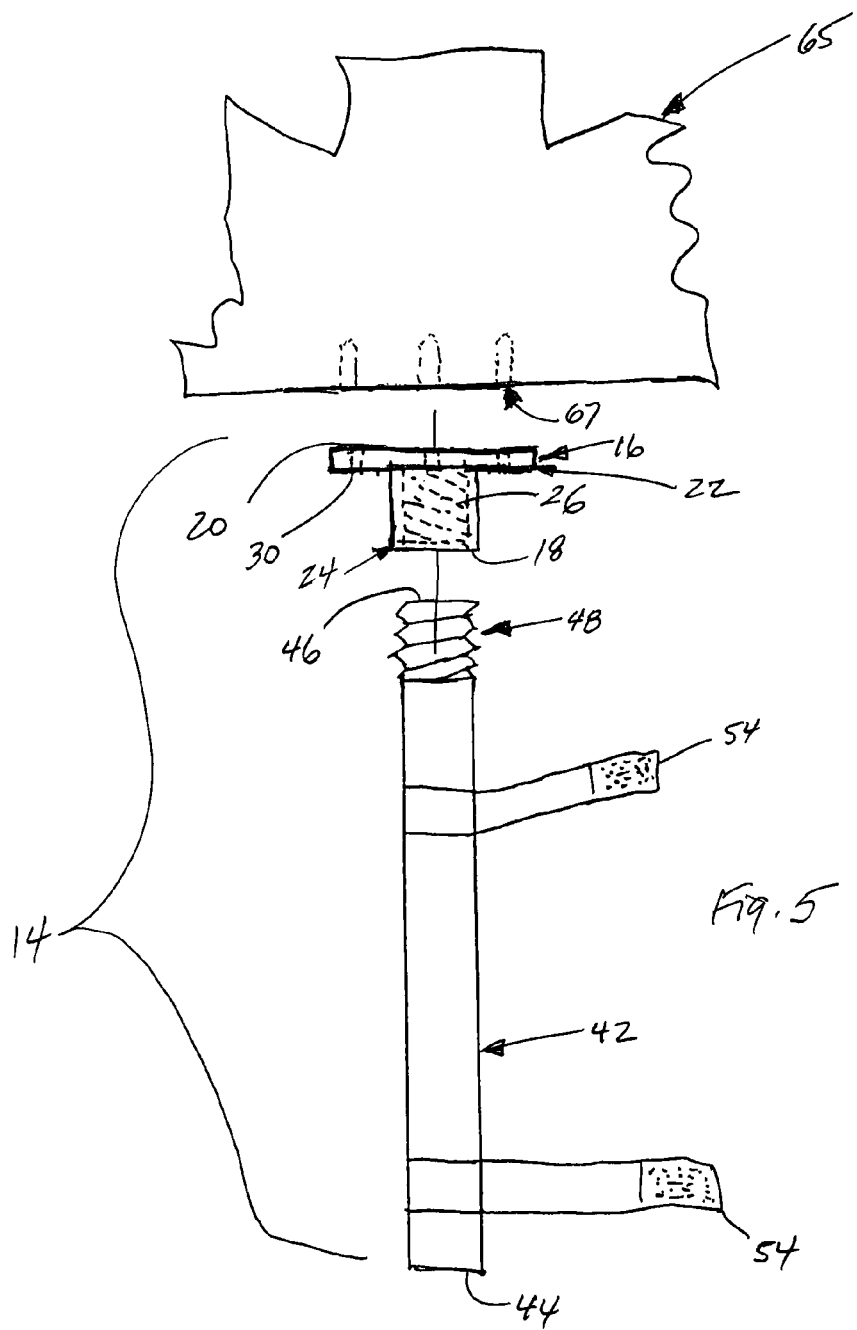
FIG. 5 shows an exploded view of one embodiment of the holder affixed to the decorative element in an alternate manner.
Figure 7:
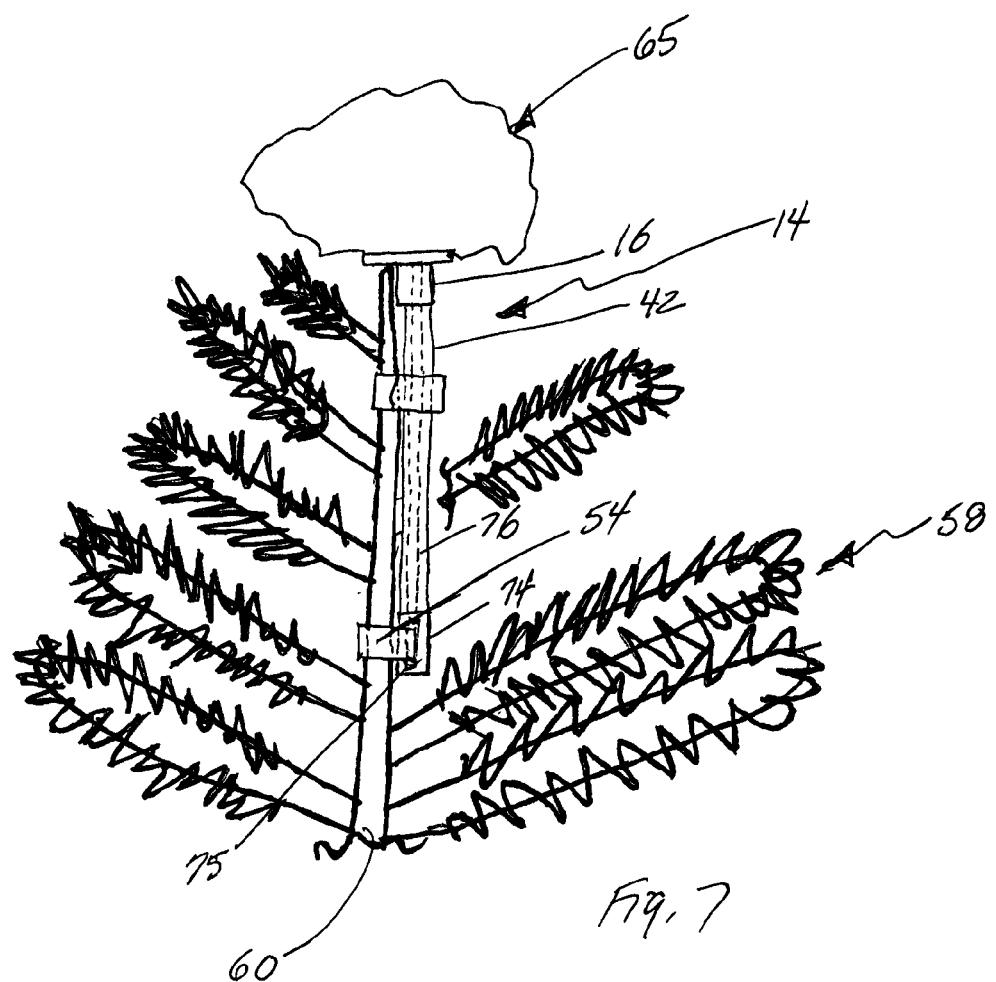
FIG. 7 shows a side view of one embodiment of the holder attached to a partial cutaway trunk of a tree.

To install the holder 14 to the top of trunk 60 of tree 58, FIG. 7, requires the user to align the plate 22 at or near the top of trunk 60 and locate the rod 42 as close to the trunk as is possible. FIGS. 1, 5, 7 also show two fasteners 54. These fasteners 54 can be strapping with hook and loop fasteners. The fasteners 54 would be wrapped around the trunk 60 and secured with the hook and loop fasteners such that the rod 42 is located near or against the trunk 60.

FIG. 7 shows an alternative arrangement of the lowest fastener 54. In this embodiment of the holder 14, there is a cap 74 on the first end 44 of rod 42. Cap 74 has a slot 75 (FIG. 4) through which the fastener 54 can be threaded and then wrapped around the trunk 60 and secured to itself. Cap 74 also has an opening 78 that provides access to the cavity 76 of the rod 42. This slot 75 thereby serves two purposes, the first to provide greater security to the holder 14 by preventing the holder 14 from possibly sliding on the straps 54 or trunk 60 and provides access to or communication with the cavity 76 to allow electrical wiring (not shown) to be routed within the rod 42 to the decorative element 65 from a power supply (not shown).

While the embodiment in FIG. 7 shows two fasteners 54, it should be understood that more fasteners 54 could be utilized to retain the holder 14 in place. The fasteners 54 should be locatable by the user such that the holder 14 and decorative element 65 is secured to the trunk 60 of the tree 58.

It should be understood that the fasteners 54 could have adhesive on one side such that they could be positioned on the rod 42 at the best location relative to the trunk 60. The limbs of the tree 58 may prevent a fixed fastener from securely attaching the holder 14 to the tree 58 trunk 60. If fasteners 54 had adhesive on one side, or part of one side, then the user could align the holder 14 to the trunk 60 and use the adhesive to affix the fasteners 54 to the rod 42 at the optimum positions.

The user should also insure that the decorative element 65 is vertical. If the decorative element 65 is not vertical, it should be appreciated that the fasteners 54 could be loosened and the rod 42 re-positioned relative to the trunk 60 of the tree 58 to obtain a pleasing vertical position.

FIG. 5 shows an alternative method to affix the coupler 16 to the decorative element 65. In this embodiment there is no cavity 69 in the decorative element 65. The coupler 16 is rotated 180 degrees relative to the rod 42 such that the second side 20 is relatively flush with the bottom surface of the decorative element 65. Holes 67 can then be drilled into the decorative element 65 to allow fastening of the coupler 16 via fasteners 32 (not shown) inserted into attachment holes 30 of the plate 22. Attachment holes 67 in the bottom of decorative element 65 corresponding in size and location the holes 30. The rod 42 second end 46 can thereby be threaded into the cylinder 24 first side 18 to secure the rod 42 to the coupler 16.

Figure 6:
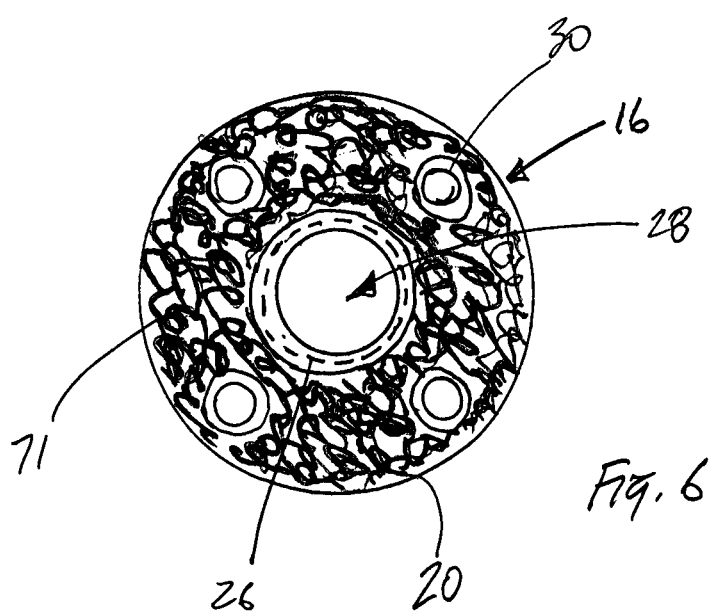
FIG. 6 shows a second side view of one embodiment of the coupler with an alternative method of affixing the coupler to the decorative item.

FIG. 6 shows a coupler 16 and alternative method of affixing the coupler 16 to the decorative element 65. In this embodiment, either the hook or loop part of the hook and loop fastener can be attached to the second side 20 of the coupler 16 with adhesive. This hook or loop can have cutouts to allow the fasteners 32 and the rod 42 to engage and wiring (not shown) to pass through. While the user should determine if the decorative element 65 can be affixed to the holder 14 with only hook and loop, if greater securing is needed, this embodiment would allow the use of fasteners 32 to the holes 67 in the decorative element 65 if needed. Obviously, the hook and loop could be affixed to the plate 22 second side 20 without the cutouts for the fasteners 32 or the cutout for the rod 42. The other portion of the hook or loop would be affixed to the decorative element 65 with an adhesive as is known in the art.

FIG. 7 shows one embodiment of the holder 14 affixed to a partial cut away view of a tree trunk 60. This embodiment shows the rod 42 having the cap 74 with the cavity 76. This embodiment could thereby have electrical wiring (not shown) passed through the rod 42 to power electrical elements of the users's choosing in the decorative element 65.

It should be appreciated that several methods could be used to affix the holder 14 to the decorative element 65. This would allow the user to choose their own decorative element 65 to attach to the tree 58. This also provides the best, easiest, least destructive attachment method to the decorative element 65 and safest and most adjustable method of affixing to a tree 58 trunk 60 the decorative element 65.

It will now be apparent to those skilled in the art that other embodiments, improvements, details and uses can be made consistent with the letter and spirit of the foregoing disclosure and within the scope of this application, which is limited only by the following claims, construed in accordance with the patent law, including the doctrine of equivalents.

What is claimed is:

1. A holder for securing a decorative element to a tree trunk, the holder comprising:
    a coupler, the coupler having a first side and a second side and a ledge, a cylinder forming the first side, a plate forming the second side, the cylinder attached to the plate at the ledge, a concentric threaded hole through the plate and cylinder, a plurality of attachment holes in the plate;
    a fixed length rod, the rod having a first end and second end, the first end having a cap affixed thereon, the second end having threads matching the threads in the cylinder and plate, at least two fasteners affixed to the rod between the first end and second end;
    the second end of the rod is removably attachable to the first side of the coupler in a first position where the second side of the coupler is configured to be affixed to the decorative element with screws through the attachment holes of the plate; and
    the second end of the rod is removably attachable to the second side of the coupler in a second position where the cylinder is configured to be inserted into the decorative element and the first side of the coupler is affixed to the decorative element with screws through the attachment holes of the plate.

2. The rod of claim 1, further comprising:
    a hole extending through a center of the rod from the first end to the second end.

3. The cap of claim 1, further comprising:
    a slot in the cap providing access to the hole in the rod.

4. The cap of claim 1, wherein:
    the slot provides an attachment location for a fastener.

5. The coupler of claim 1, further comprising:
    the second side of the coupler is configured to be affixed to the decorative element with hook and loop fasteners.

6. The holder of claim 1, further comprising:
    wiring for power entering the slot in the cap running a length of the rod and exiting the second side of the coupler to power electrical elements in the decorative element.

7. The coupler of claim 1, further comprising:
    ribs on an outer surface of the cylinder.

8. The coupler of claim 7, further comprising:
    ribs on an outer surface of the cylinder.

9. A holder for securing a decorative element to a tree trunk, the holder comprising:
    a coupler, the coupler having a first side and a second side and a ledge, a cylinder forming the first side, a plate forming the second side, the cylinder attached to the plate at the ledge, a threaded concentric hole through the plate and cylinder, a plurality of attachment holes in the plate;
    a fixed length rod, the rod having a first end and second end, the first end having a cap-affixed thereon, the second end having threads matching the threads in the cylinder and plate, at least two fasteners affixed to the rod between the first end and second end; and
    the second end of the rod is attached to the second side of the coupler in a first position where the cylinder is configured to be inserted into the decorative element and the first side of the coupler is configured to be screwed to the decorative element; and
    the second end of the rod is attached to the first side of the coupler in a second position where the second side of the coupler is configured to be affixed to the decorative element with screws.

10. The rod of claim 9, further comprising:
    a hole extending through a center of the rod from the first end to the second end.

11. The cap of claim 9, further comprising:
    a slot in the cap providing access to the hole in the rod.

12. The cap of claim 9, wherein:
    the slot provides an attachment location for the fastener.

13. The coupler of claim 9, further comprising:
    the ledge of the coupler is affixed to the decorative element with hook and loop fasteners.

14. The holder of claim 9, further comprising:
    wiring for power entering the slot in the cap running a length of the rod and exiting the first side of the coupler to power electrical elements in the decorative element.

15. A holder for attachment to a decorative element, the holder comprising: a fixed length rod, the rod having a first end and a second end, a cavity in the rod extending from the first end to the second end, threads on the second end;
    a coupler, the coupler having a first side with a cylinder, the cylinder affixed to a plate forming a ledge, the plate forming a second side of the coupler, the cylinder having a threaded hole concentric with a a threaded center hole in the plate,
    a plurality of attachment holes in the plate; and the second end of the rod configured to be screwed to the second side of the coupler in a second position where the cylinder is configured to be inserted into the decorative element and the plate is configured to be screwed to the decorative element, the second end of the rod screwed to the first side of the coupler in a first position where the plate is configured to be flushed with and affixed to the decorative element with screws.

* * * * *